Patented Dec. 9, 1941

2,265,838

UNITED STATES PATENT OFFICE 2,265,838

AMINES AND THEIR PRODUCTION

Winfrid Hentrich, Dusseldorf-Reisholz, and Wilhelm Jakob Kaiser, Dessau, and Carl Albert Lainau, deceased, late of Dusseldorf, Germany, by Adolf Bartholomaus, administrator, Dusseldorf, Germany, assignors, by mesne assignments, to The Procter & Gamble Company, Cincinnati, Ohio, a corporation of Ohio No Drawing. Application December 28, 1937, Serial No. 182,164. In Germany January 2, 1937

14 Claims. (Cl. 260—503)

This invention relates to the production of certain hydroaromatic amines and to such compounds as new products of manufacture.

In accordance with the process of the copending application Serial No. 155,002, filed on July 22, 1937, by two of the present applicants, a new class of hydroaromatic amines are disclosed which contain at least one side chain having not less than 4 carbon atoms. These amines are described therein as being obtained, for example, by reacting hydroaromatic compounds substituted by at least one hydrocarbon radical having not less than 4 carbon atoms, and by at least one means substitutable by a basic group, with various nitrogen-containing compounds.

In accordance with the present invention, an additional class of nitrogen compounds are provided which are produced by reacting hydroaromatic amines which are substituted in the hydroaromatic nucleus by at least one organic radical having not less than 4 carbon atoms with alkylation agents of almost any type. The organic radical is preferably of an aliphatic or cycloaliphatic nature.

The hydroaromatic amines suitable as raw materials for the production of the novel products of the present invention possess the general formula R(Hy Ar) NR'R''. In this general formula R denotes an organic radical containing at least 4 carbon atoms. In the most important embodiment the R radical is bound in secondary manner to the hydroaromatic group but, in its broader aspects, the invention includes compounds in which such radical is joined in primary manner and as well those joined in tertiary manner. Among the radicals which are suitable the following are given by way of example: the butyl, pentyl, hexyl, heptyl, octyl, diisobutyl, nonyl, decyl, undecyl, dodecyl, triisobutyl, tetradecyl, hexadecyl and octadecyl radicals.

The above R radicals may be either normal or branched hydrocarbon radicals. The invention also includes radicals which are interrupted in the chain by oxygen, sulfur or nitrogen atoms. In accordance with another portion of the present invention, the R radical denotes cycloaliphatic radicals such as those cyclohexyl radicals, hexahydrobenzyl radicals and decahydromenaphthyl radicals which are substituted by alkyl radicals. The invention is not limited to the use of single amines for mixtures of the different amines may be employed with good results.

The (Hy Ar) in the above formula refers to a hydroaromatic radical. Such radical may be, for example, that derivable from cyclohexane or decahydronaphthalene or dodecahydrodiphenyl or their substitution products and like compounds. In the formula, R' and R'' refer to hydrogen or optional organic radicals which may be, for example, lower molecular alkyl radicals.

In accordance with the preferred process of the present invention the amines hereinbefore described are reacted with alkylation agents which contain at least one hydrophile group. Another embodiment involves the reaction with alkylation agents which contain a radical readily permitting the introduction of a hydrophile group. Such hydrophile groups are, for example, acid groups, hydroxyl groups, ether groups, mercapto groups, amino groups and ester groups. The compounds produced by these processes are of particular value as capillary active agents or as compounds from which such agents may be produced.

A preferred class of alkylation agents comprises, for example, alkyl halide, such as ethyl chloride, butyl bromide, n-butyl iodide, n-octyl chloride, n-dodecyl chloride, benzyl chloride, cyanuric chloride. Another class of suitable alkylation agents are the acid and neutral sulfuric acid esters of alcohols such as dimethyl sulfate, sulfuric acid esters of octyl alcohol, of dodecyl alcohol, and of tetradecyl alcohol. Another class of agents are aromatic compounds containing one or more readily replaceable halogen atoms such as for example, dinitrochlorobenzene, nitrochlorobenzoic acid and the like. Yet another class of alkylation agents which react with considerable advantage comprise alkylene oxides such as ethylene oxide, propylene oxide, and epichlorhydrine. Ethylene imine may also be used. Finally there may be mentioned as alkylation agents the aldehydes and ketones, particularly those which are readily reactive such as formaldehyde, acetaldehyde, benzaldehyde and cyclohexanone.

From the foregoing paragraph it will be observed that the alkylation agents may be of an extremely varied nature and include esters derived from alcohols and strong acids such as halogen hydracids, sulfuric acid, para-toluene sulfonic acid and similar acid compounds. The alkylation agents may be the alcohols themselves, may be substances containing double bonds such as olefines and may be aldehydes, ketones, alkylene oxides, acetales, metal-organic compounds, halogen compounds, nitro compounds or similar substances.

The present invention includes not only those alkylation agents adapted to introduce aliphatic radicals into the amines but also includes those so-called alkylation agents which introduce cycloaliphatic radicals, aralkyl radicals, aryl radicals and heterocyclic radicals into the amine compounds.

The reaction between the alkylation agents and the amines in accordance with the present invention is generally aided through the use of elevated temperatures and may be carried out if so desired in the presence of, or in the absence of solvents or diluents. In bringing about some of the reactions it is desirable to use acid-binding agents of conventional nature.

Due to the varied nature of the raw materials which may be reacted in accordance with the present invention and to the possibility of using different reaction conditions, compounds are formed which may be either hydroaromatic secondary amines or hydroaromatic tertiary amines or hydro-aromatic quaternary ammonium compounds. The last mentioned compounds are capable of providing solutions in water possessing good foaming and moistening properties because of which they may be used with good results as cation-active and capillary active agents as well as in disinfectants.

Particularly valuable among the secondary and tertiary amines are those amines containing hydrophile groups or those containing radicals which may be readily substituted by hydrophile groups. These compounds also possess good capillary-active properties and therefore can be used with considerable advantage as moistening, washing, cleansing, emulsifying and dispersing agents.

An important class of products of the present invention may be referred to as alkyl-hydroaromatic amines of the general formula

R [Hy Ar] N R' R''' wherein R is one or more organic radicals containing not less than 4 carbon atoms, [Hy Ar] is a hydroaromatic radical, N is nitrogen, R' is hydrogen or an organic radical and R''' is an organic radical containing a hydrophile group.

The invention may be illustrated by the following examples wherein all parts are given by weight.

*Example 1*

One thousand one hundred parts of glycide are slowly added to 225 parts of (4-sec.-octylcyclohexyl) methyl amine at a temperature of 160 to 170° C. The reaction product obtained is a highly viscous clear liquid, which when dissolved in water produces clear solutions having good foaming, moistening and dispersing properties.

*Example 2*

Two hundred and twenty-five parts of (4-sec.-octylcyclohexyl) methyl amine are reacted with 770 parts of ethylene oxide in an autoclave provided with a stirring means at a temperature of 130 to 140° C. The resulting product is a water soluble viscous liquid, aqueous solutions of which have good capillary-active qualities.

*Example 3*

Two hundred and sixty parts of a mixture of 4-sec.-alkyl-2-methyl-cyclohexyl amine having a boiling point range of 135 to 155° C. at a pressure of 2 mm. (the alkyl radical equals $C_6H_{13}$ to $C_{12}H_{25}$) with 88 parts of beta-chloro-ethane sulfonic acid in the form of its sodium salt in the presence of 1500 parts of aqueous alcohol of 60% strength are heated in an autoclave provided with a stirring means to a temperature of about 160° C. Upon completion of the reaction 200 parts of a 10% aqueous solution of caustic soda are added, after which the excess of the base is separated. From the aqueous solution there is obtained the sodium salt of (alkyl-methyl-cyclohexyl)-amino-ethane sulfonic acid in the form of a colorless paste, aqueous solutions of which possess good capillary-active qualities.

*Example 4*

Two hundred parts of the amine mixture described in Example 3 are heated to a temperature of 100 to 110° C. together with 81 parts of ethylene chlorhydrine and 100 parts of pyridine. When the reaction is complete, the pyridine is distilled off leaving N-(4-sec.-alkyl-2-methyl-cyclohexyl)-hydroxy ethyl amine having a boiling point range of from 165 to 190° C. at a pressure of 2 mm.

Two hundred and thirty parts of this amine mixture are then sulfonated in known manner by treatment with 120 parts of chlorosulfonic acid in the presence of 200 parts of pyridine. The reaction mass is then neutralized with soda lye, after which the sulfonation product is precipitated as a paste from an aqueous solution of the reaction mass by means of common salt, after which the sulfonation product is dissolved in ether. After drying the mass through treatment with Glauber's salt and distilling to remove the ether, an almost colorless, paste-like mass is obtained. In aqueous solutions this sulfonation mass possesses good foaming and wetting properties, the solutions being outstanding particularly because of their power of dispersing lime soap.

*Example 5*

Three hundred and seventy parts of N-methyl-N - benzyl - 4 - n-dodecyl - cyclohexyl amine are heated and boiled under reflux condensation while in admixture with 140 parts of dimethyl sulfate and 1500 parts of dry benzene. When the reaction is complete, the benzene is distilled off, leaving a quaternary ammonium compound in the form of a colorless crystal mass which dissolves in water to form a clear solution. This solution possesses good moistening and foaming properties.

*Example 6*

At a temperature of 30 to 40° C., 56 parts of dimethyl sulfate are added in small portions during stirring to a mixture of 140 parts of (4-sec.-dodecyl - 2 - methyl - cyclohexyl)-amine and 180 parts of a 10% solution of caustic soda. Next, 90 parts of a 20% solution of caustic soda are added to the reaction mass. Then 56 additional parts of dimethyl sulfate are added in small portions. The oil layer which precipitates from the lye is separated, washed with water and then dried in a vacuum. Next, the crude methylation product is dissolved in an equal quantity of dry benzene and boiled under a reflux condenser together with 56 additional parts of dimethyl sulfate. After the boiling has been continued for an extended period, a quaternary ammonium compound is obtained and may be separated from the benzene solution by treatment with water. After evaporation of the water from the aqueous solution, the said compound is obtained in the form of a paste, which paste produces solutions having good capillary-active qualities.

In the foregoing process (4-dodecyl-2-methyl-cyclohexyl)-dimethyl amine having a boiling point range of 155 to 160° C. at a pressure of 2 mm. may be obtained from the benzene solution as a by-product. Thirty-one parts of this tertiary base are dissolved in 150 parts of alcohol and with 60 parts of a 6% hydrogen peroxide solution are heated to 60° C. until a sample shows water solubility. The alcohol is then separated from the mass and leaves the (4-dodecyl-2-methyl-cyclohexyl)-dimethyl-amine-oxide in the form of a paste.

Example 7

Two hundred and twenty-five parts of 4-sec.-octyl-2-methyl-cyclohexyl amine having a boiling point of 110 to 120° C. at a pressure of 2 mm. are mixed with 120 parts of benzaldehyde and the mixture is heated for an extended period to a temperature of 70° C. Through this reaction a benzylidene compound is produced having a boiling point of 155 to 175° C. This compound is next dissolved in four times its quantity of methyl alcohol and then reduced by treatment at a temperature of about 160° C. under a pressure of hydrogen of 40 atmospheres in the presence of a nickel catalyst. The product obtained in this manner is (4-sec.-octyl-2-methyl-cyclohexyl)-benzyl amine, which has a boiling point of 160 to 180° C. at a pressure of 2 mm. and appears as an oily liquid. By treatment with dimethyl sulfate, the product can be converted into the quaternary ammonium compound. This compound is obtained in the form of a colorless crystal mass and is soluble in water. The resulting solutions have capillary-active and disinfecting qualities.

In a similar manner, (4-sec.-octyl-2-methyl-cyclohexyl)-furfuryl amine can be produced if an equal quantity of furfurol is used instead of benzaldehyde in the foregoing process. By means of a suitable alkylation reaction, the furfuryl amine obtained can be converted into a quaternary ammonium compound. It also can be converted by treatment with chloroacetic acid into (4-sec.-octyl-2-methyl-cyclohexyl)-furfuryl-amino acetic acid. This compound also dissolves in hard water to form clear solutions which possess good moistening and foaming properties.

Example 8

Two hundred and sixty parts of a mixture of 4-sec.-alkyl-2-methyl-cyclohexyl amines boiling within the range of 135 to 155° C. at a pressure of 2 mm. (the alkyl radical equals $C_6H_{13}$ to $C_{12}H_{25}$), together with 95 parts of chloroacetic acid and 120 parts of a 30% solution of caustic soda are heated under a reflux condenser until reaction is complete to the desired extent. By purification, a mixture of (4-sec.-alkyl-2-methyl-cyclohexyl)-amino acetic acids is obtained in the form of a viscous oil which is soluble in water, forming clear solutions. Such aqueous solutions have good foaming and moistening properties.

In the foregoing example, the chloroacetic acid may be substituted by its derivatives, such, for example, as the chloroacetic acid ethyl esters. If such derivative is used, then the cyclohexyl amino acetic acid ester obtained can be subsequently saponified.

It should be understood that the present invention is not limited to the specific procedure and compounds hereinbefore disclosed, but that it extends to all equivalent treatments and compounds coming within the scope of the appended claims.

We claim:

1. The process which comprises reacting a hydroaromatic amine mono-substituted in the completely hydrogenated hydroaromatic nucleus by an alkyl radical containing not less than 4 carbon atoms with an alkylation agent.

2. The process which comprises reacting a hydroaromatic amine mono-substituted in the completely hydrogenated hydroaromatic nucleus by an alkyl radical containing not less than 4 carbon atoms with an alkylation agent having in its molecule at least one hydrophile group which remains in the nitrogen compound resulting from the reaction.

3. The process which comprises reacting a hydroaromatic amine mono-substituted in the completely hydrogenated hydroaromatic nucleus by an alkyl radical containing not less than 4 carbon atoms with a halide alkylation agent.

4. The process which comprises reacting a hydroaromatic amine mono-substituted in the completely hydrogenated hydroaromatic nucleus by an alkyl radical containing not less than 4 carbon atoms with a halide alkylation agent having in addition to the halogen radical at least one hydrophile group.

5. The process which comprises reacting a hydroaromatic amine mono-substituted in the completely hydrogenated hydroaromatic nucleus by an alkyl radical containing not less than 4 carbon atoms with an oxide alkylating agent from the group consisting of alkylene oxides and alkylene epichlorhydrines.

6. The process which comprises reacting a hydroaromatic amine mono-substituted in the completely hydrogenated hydroaromatic nucleus by an alkyl radical containing not less than 4 carbon atoms with an oxide alkylating agent from the group consisting of alkylene oxides and alkylene epichlorhydrines having in addition to the oxide grouping at least one hydrophile group.

7. The process which comprises reacting a hydroaromatic amine mono-substituted in the completely hydrogenated hydroaromatic nucleus by an alkyl radical containing not less than 4 carbon atoms with an alkylating agent composed of an ester of an alcohol with a strong mineral acid.

8. Capillary-active compounds comprising essentially amines having attached to the nitrogen atom a cyclohexyl radical mono-substituted by an alkyl radical having at least 4 carbon atoms, and also having attached to said nitrogen atom a hydrocarbon radical containing a hydrophile group.

9. Capillary-active compounds comprising essentially amines having attached to the nitrogen atom a cyclohexyl radical substituted by a secondary alkyl radical having from 6 to 12 carbon atoms and also having attached to said nitrogen atom a sulfonated alkyl radical.

10. Capillary-active compounds comprising essentially alkyl-hydroaromatic amines of the general formula $$R[Hy\ Ar]NR'R'''$$

wherein R is an alkyl radical containing not less than 4 carbon atoms, [Hy Ar] is a completely hydrogenated hydroaromatic radical, N is nitrogen, R' is selected from the group consisting of hydrogen and aliphatic radicals and R''' is a hydrocarbon radical containing a hydrophile group.

11. The compounds described in claim 10 wherein R''' is a sulfonated alkyl radical.

12. Capillary-active compounds comprising essentially amines having attached to the nitrogen atom a cyclohexyl radical substituted by an alkyl radical having at least 4 carbon atoms and also having attached to the said nitrogen atom an alkyl carboxylic acid.

13. The process which comprises reacting completely hydrogenated hydroaromatic amines mono-substituted in the hydroaromatic nucleus by an alkyl radical containing at least 6 carbon atoms, with an alkylation agent.

14. Capillary-active compounds comprising essentially an amine having attached to its nitrogen atom a completely hydrogenated hydroaromatic radical substituted by an alkyl radical having at least 6 carbon atoms and also having attached to said nitrogen atom a hydrocarbon radical containing a hydrophile group.

WINFRID HENTRICH.
WILHELM JAKOB KAISER.
ADOLF BARTHOLOMAUS,
*Administrator of the Estate of Carl Albert Lainau, Deceased.*